US012116659B2

(12) United States Patent
Zhai et al.

(10) Patent No.: US 12,116,659 B2
(45) Date of Patent: Oct. 15, 2024

(54) PREPARATION METHOD OF LARGE-SCALE DIE BLANK FOR VACUUM ISOTHERMAL FORGING

(71) Applicant: BEIJING RESEARCH INSTITUTE OF MECHANICAL&ELECTRICAL TECHNOLOGY CO., LTD.CAM, Beijing (CN)

(72) Inventors: Yuewen Zhai, Beijing (CN); Hao Yang, Beijing (CN); Leyu Zhou, Beijing (CN); Xiaomao He, Beijing (CN)

(73) Assignee: BEIJING RESEARCH INSTITUTE OF MEHCNAICAL & ELECTRICAL TECHNOLOGY CO. LTD.CAM, Beijing (CN)

( * ) Notice: Subject to any disclaimer, the term of this patent is extended or adjusted under 35 U.S.C. 154(b) by 0 days.

(21) Appl. No.: 18/576,796

(22) PCT Filed: Jul. 15, 2022

(86) PCT No.: PCT/CN2022/105931
§ 371 (c)(1),
(2) Date: Jan. 5, 2024

(87) PCT Pub. No.: WO2023/035773
PCT Pub. Date: Mar. 16, 2023

(65) Prior Publication Data
US 2024/0263290 A1  Aug. 8, 2024

(30) Foreign Application Priority Data
Sep. 8, 2021  (CN) .......................... 202111046807.5

(51) Int. Cl.
*C22F 1/18* (2006.01)
*B23K 20/02* (2006.01)
(Continued)

(52) U.S. Cl.
CPC .............. *C22F 1/183* (2013.01); *B23K 20/02* (2013.01); *B23K 20/24* (2013.01); *B23P 15/24* (2013.01);
(Continued)

(58) Field of Classification Search
CPC . C22F 1/183; C22F 1/02; B23K 20/02; B23K 20/24; B23K 2103/18; B23P 15/24; C23G 1/106
See application file for complete search history.

(56) References Cited

U.S. PATENT DOCUMENTS 5,577,093 A   11/1996  Benz et al.

FOREIGN PATENT DOCUMENTS

CN   101011739 A  *  8/2007
CN   103320634 A     9/2013
(Continued)

OTHER PUBLICATIONS

Reiser et al., "Tungsten laminates made of ultrafine-grained (UFG) tungsten foil—Ageing of tungsten-titanium (W—Ti) laminates," Int. Journal of Refractory Metals and Hard Materials, 51 (2015) pp. 264-274 (Year: 2015).*

(Continued)

*Primary Examiner* — John A Hevey
(74) *Attorney, Agent, or Firm* — John A. Miller; Shumaker, Loop & Kendrick, LLP

(57) ABSTRACT

An additive method for preparing a large die blank for isothermal forging comprising preparing a plurality of titanium-zirconium-molybdenum alloy plate-shaped elements of a preset shape; preparing a plurality of foil-shaped intermediate layers of pure tantalum, a niobium-tungsten alloy and a tantalum-tungsten alloy of a preset shape; forming an assembly of a preset configuration, such that the foil-shaped intermediate layers are sandwiched between the (Continued)

titanium-zirconium-molybdenum alloy plate-shaped elements; applying an axial pressure to the assembly under high-temperature vacuum to perform diffusion connections to obtain a primary blank; subjecting the primary blank to a homogenization treatment under a high temperature, vacuum or inert gas protection to homogenize the structure and components at a connection interface in the primary blank; and cooling the homogenized primary blank to obtain a die blank.

8 Claims, 4 Drawing Sheets

(51) Int. Cl.
  *B23K 20/24* (2006.01)
  *B23K 103/18* (2006.01)
  *B23P 15/24* (2006.01)
  *C22F 1/02* (2006.01)
  *C23G 1/10* (2006.01)

(52) U.S. Cl.
  CPC ............ *C22F 1/02* (2013.01); *B23K 2103/18* (2018.08); *C23G 1/106* (2013.01)

(56) References Cited

FOREIGN PATENT DOCUMENTS

| | | | |
|---|---|---|---|
| CN | 103421969 | A | 12/2013 |
| CN | 105522349 | A | 4/2016 |
| CN | 105598327 | A | 5/2016 |
| CN | 107175398 | A | 9/2017 |
| CN | 107486619 | A | 12/2017 |
| CN | 107717341 | A | 2/2018 |
| CN | 107876674 | A | 4/2018 |
| CN | 109926678 | A | 6/2019 |
| CN | 111014869 | A | 4/2020 |
| CN | 110453127 | A | 7/2020 |
| CN | 111515516 | A | 8/2020 |
| CN | 111515517 | A | 8/2020 |
| CN | 113878219 | A | 1/2022 |
| DE | 102005003445 | A1 | 8/2006 |
| EP | 0910679 | B1 * | 7/2001 |
| KR | 101719452 | B1 | 3/2017 |

OTHER PUBLICATIONS

EP-0910679-B1, Roedhammer, machine translation. (Year: 2001).*
CN-101011739-A, Chen et al., machine translation. (Year: 2007).*

* cited by examiner

PREPARATION METHOD OF LARGE-SCALE DIE BLANK FOR VACUUM ISOTHERMAL FORGING

CROSS REFERENCE TO RELATED APPLICATIONS

This application is a National Stage application of International Application No. PCT/CN2020/105931 filed on Jul. 15, 2022, which claims priority to Chinese Application No. 202111046807.5 filed Sep. 8, 2021.

BACKGROUND

Field

The present disclosure relates to the technical field of metal material manufacturing, in particular to a preparation method of a large-scale die blank for vacuum isothermal forging, and especially relates to a preparation method of a titanium-zirconium-molybdenum alloy die blank for vacuum isothermal forging.

Discussion of the Related Art

The vacuum isothermal forging is particularly suitable for the precision forming of materials which have narrow forging temperature zone, poor plasticity and large deformation resistance and thus are difficult to deform, such as titanium alloy, nickel-based superalloy and the like. However, since the vacuum isothermal forging die is used at a high temperature and has a higher rheological stress than the forged part, stringent requirements are put forward for the high temperature performance of the die material. Currently, the working temperature of a die cavity during vacuum isothermal forging of nickel-based superalloy or titanium alloy is mostly 700-1200° C., and in this temperature range, the die needs to has high strength and hardness, good wear resistance and sufficient toughness. The titanium-zirconium-molybdenum alloy (TZM alloy for short) is an alloy in which molybdenum (Mo) is the matrix and small amount of titanium (Ti), zirconium (Zr) and carbon (C) is added, and has higher recrystallization temperature (1350-1400° C.) than metal molybdenum, and superior high-temperature mechanical property and corrosion resistance. Therefore, the titanium-zirconium-molybdenum alloy is used as an important high-temperature-resistant structural material and is very suitable for manufacturing high-temperature-resistant die for vacuum isothermal forging. However, since the titanium-zirconium-molybdenum alloy has a high melting point (about 2640° C.), the smelting or powder metallurgy preparation of the titanium-zirconium-molybdenum alloy with a larger size has greater difficulty, and the phenomena of coarse crystals and component segregation are easy to occur. Moreover, since the titanium-zirconium-molybdenum alloy has large high-temperature deformation resistance, the difficulty of refining grains and modifying large-scale die blanks by hot processing means such as forging, rolling and the like is increased, the large-scale die blanks are prone to the phenomenon of uneven structures and chemical distribution, and the mechanical property of the die blanks tends to decrease rapidly along with the increase of the sizes of the die blanks.

When preparing large-scale metal part, the existing method proposes to stack a plurality of small units into a preset shape, then encapsulate all the small units by electron beam welding to achieve the vacuum state between the units, realize interlayer diffusion between the small units by large-scale deformation (upsetting) and high-temperature heat preservation to realize interlayer forge welding, so that the plurality of units is forge-weld together to form a large metal blank. For example, Chinese patent application CN 105598327A, "Layered Multi-column Stacking Metal Constructing and Forming Method", CN 107717341A "Modular Metal Constructing and Forming Method", CN107876674A "Metal Graded Constructing and Forming Method", and CN 105522349A "Homogenized Metal Constructing and Forging Method" are methods of forge welding a plurality of small units into a large-scale metal part by using constructing and forging method. However, titanium-zirconium-molybdenum alloy, which is high-melting-point alloy that is difficult to deform and has a large deformation resistance at high temperature, and thus is difficult to deform with a large deformation amount by forging, i.e., are difficult to upset. Therefore, for the titanium-zirconium-molybdenum alloy, it is difficult to realize interdiffusion in interface of each small unit by applying pressure at high temperature, and it is also difficult to realize good forge welding bonding between the units. Meanwhile, titanium-zirconium-molybdenum alloy has poor welding performance, which makes it difficult to obtain a welding seam with good performance by electron beam welding, which in turn significantly changes the microstructure and properties of the titanium-zirconium-molybdenum alloy due to high temperature generated therein. Electron beam welding also increases process complexity and manufacturing costs. Moreover, the titanium-zirconium-molybdenum alloy is prone to oxidation and volatilization under the high-temperature condition, which make it unsuitable for the conventional constructing and forging method. Therefore, the above-mentioned constructing and forging method based on forging and welding is not suitable for titanium-zirconium-molybdenum alloy, and a method suitable for preparing large-scale titanium-zirconium-molybdenum alloy needs to be developed.

SUMMARY

In view of the above problems in the prior art, the present disclosure provides an additive manufacturing method for vacuum isothermally forging a large-scaled die blank, which can effectively reduce the influence of the non-uniformity of structure, composition and performance in the titanium-zirconium-molybdenum alloy blank on the service performance of a large-scaled alloy, and is particularly suitable for manufacturing a large-scaled titanium-zirconium-molybdenum die blank.

In order to achieve the above object, the present disclosure provides a preparation method of a large-scale die blank for vacuum isothermal forging, comprising the steps of:

preparing a plurality of plate-shaped units of titanium-zirconium-molybdenum alloy with a thickness of 20-100 mm based on predetermined shape(s), respectively;

preparing a plurality of foil-shaped intermediate layers of tantalum, niobium-tungsten alloy or tantalum-tungsten alloy with a thickness of 40-150 μm based on predetermined shape(s), respectively;

successively assembling the plate-shaped units of titanium-zirconium-molybdenum alloy and the foil-shaped intermediate layers based on a predetermined configuration to form an assembly body, so that, each of the foil-shaped intermediate layers is sandwiched between the plate-shaped units of titanium-zirconium-molybdenum alloy in the assembly body;

applying an axial pressure of 6-9 MPa for bonding time not less than 3 hours to the assembly body at a bonding temperature 20-100° C. lower than the recrystallization temperature of the titanium-zirconium-molybdenum alloy and a vacuum degree of $10^{-3}$-$10^{-2}$ Pa by means of a vacuum diffusion welding furnace, so that diffusion bonding between the plated-shaped units of titanium-zirconium-molybdenum alloy and the foil-shaped intermediate layer occurs to obtain a primary blank;

homogenizing the primary blank for a homogenization time of 2-24 hours at a homogenization temperature 50-150° C. lower than the recrystallization temperature of the titanium-zirconium-molybdenum alloy under vacuum or inert gas protection, to homogenize the microstructure and composition at bonding interfaces in the primary blank;

cooling the homogenized primary blank to obtain a die blank.

By utilizing the diffusion bonding technology and adopting a tantalum, niobium-tungsten alloy or tantalum-tungsten alloy foil as the intermediate layer, adding the homogenization process, and improving the constructing and forging process, the preparation of large-scale die blank with titanium-zirconium-molybdenum alloy is realized. Without being bound by theory, it is believed that the additive manufacturing method according to the present disclosure promotes interdiffusion among molybdenum element of the plated-shaped units of titanium-zirconium-molybdenum alloy and the metal elements of the foil-shaped intermediate layer, forms a diffusion layer at the bonding interface of the unit and the intermediate layer, and effectively realizes the bonding of the units via the foil-shaped intermediate layers, so that the manufacturing of the large-scale die blank of the titanium-zirconium-molybdenum alloy can be realized by utilizing the constructing and forming process. In addition, because the temperature of the diffusion bonding and homogenization treatment is lower than the recrystallization temperature of the titanium-zirconium-molybdenum alloy, the additive manufacturing method of the present disclosure does not significantly changes the microstructure and properties of the plated-shaped units of titanium-zirconium-molybdenum alloy.

In one embodiment of the present disclosure, in the preparing of the plurality of plated-shaped units of titanium-zirconium-molybdenum alloy with the thickness of 30-100 mm, the plated-shaped units of titanium-zirconium-molybdenum alloy are subjected to machining, pre-grinding and polishing, so that the roughness Ra of the bonding surfaces of the plated-shaped units of titanium-zirconium-molybdenum alloy with the foil-shaped intermediate layers is 0.4-0.8, and the parallelism between each bonding surface and the pressure surface of the plated-shaped units of titanium-zirconium-molybdenum alloy subjected to the axial pressure is less than 0.02 mm.

In one embodiment of the present disclosure, the tantalum is pure tantalum with a purity of 99.5% or more, and the niobium-tungsten alloy or the tantalum-tungsten alloy is Nb-(2-10) W or Ta-(2-10) W (wt %).

In this way, by further defining the foil-shaped intermediate layer, good interdiffusion between the foil-shaped intermediate layers and the plate-shaped units of titanium-zirconium-molybdenum alloy is facilitated, and the performance of the die at high temperature is further improved.

In one embodiment of the present disclosure, in preparing the plurality of foil-shaped intermediate layers of tantalum, niobium-tungsten alloy, or tantalum-tungsten alloy with a thickness of 60 to 80 μm, the foil-shaped intermediate layers are soaked with 10 wt % hydrochloric acid for 10 minutes, and then the foil-shaped intermediate layers are ultrasonically cleaned with alcohol or acetone.

In this way, by further defining the preparation of the plate-shaped unit of titanium-zirconium-molybdenum alloy and the foil-shaped intermediate layer, desired parallelism among surfaces to be bonded and between each bonding surface and the pressure surface is achieved, the surfaces to be bonded have desired roughness and cleanliness, the bonding quality between the unit and the intermediate layer is improved, and the performance of the die at high temperature thus is improved.

In one embodiment of the present disclosure, the bonding temperature is a temperature 20-60° C. lower than the recrystallization temperature of the titanium-zirconium-molybdenum alloy, the axial pressure is 7-9 MPa, and the bonding time is 3-6 hours.

In one embodiment of the present disclosure, the homogenization temperature is a temperature 80-150° C. lower than the recrystallization temperature of the titanium-zirconium-molybdenum alloy, and the homogenization time is 5-12 hours.

In one embodiment of the present disclosure, in cooling the homogenized primary blank, the cooling is carried out from the homogenization temperature to 1000° C. at a cooling rate of 2-6° C./min and from 1000° C. to 500° C. at a cooling rate of 10-15° C./min.

In one embodiment of the present disclosure, in cooling the homogenized primary blank, after cooling to 500° C., it is held at a temperature of 500° C. for 1 hour to remove the stress caused by the cooling.

In this way, by further defining the process parameters such as the bonding temperature, the axial bonding pressure, the bonding time, the homogenization temperature, the homogenization time, the cooling rate and the like, the interdiffusion of among molybdenum element in the titanium-zirconium-molybdenum alloy unit and metal elements of the foil-shaped middle layer is facilitated and the molybdenum content of the middle layer is further increased, so that the performance of the die at high temperature is further improved.

In one embodiment of the present disclosure, the homogenization and cooling processes are performed in a vacuum diffusion welding furnace. In other words, homogenization and subsequent controlled cooling can be performed directly after the pressurized bonding by adjusting the temperature of the vacuum diffusion welding furnace.

In one embodiment of the present disclosure, the homogenization and cooling processes are performed in a vacuum furnace or an atmosphere-shielded furnace. In other words, it needs to wait for the cooling of the vacuum diffusion furnace to remove the joint, and then complete the subsequent homogenization and controlled cooling process in the vacuum furnace or atmosphere-shielded furnace. This method can shorten the service time of the vacuum diffusion welding furnace and improve the production efficiency.

The foregoing description of the present disclosure will be more readily understood in the following description of various embodiments with reference to the accompanying drawings.

BRIEF DESCRIPTION OF THE DRAWINGS

The accompanying drawings of the present disclosure are provided below only to illustrate the present disclosure in a more intuitive form, they are exemplary, and are not intended to limit the scope of the present disclosure.

DETAILED DESCRIPTION OF THE EMBODIMENTS

Figure 1:
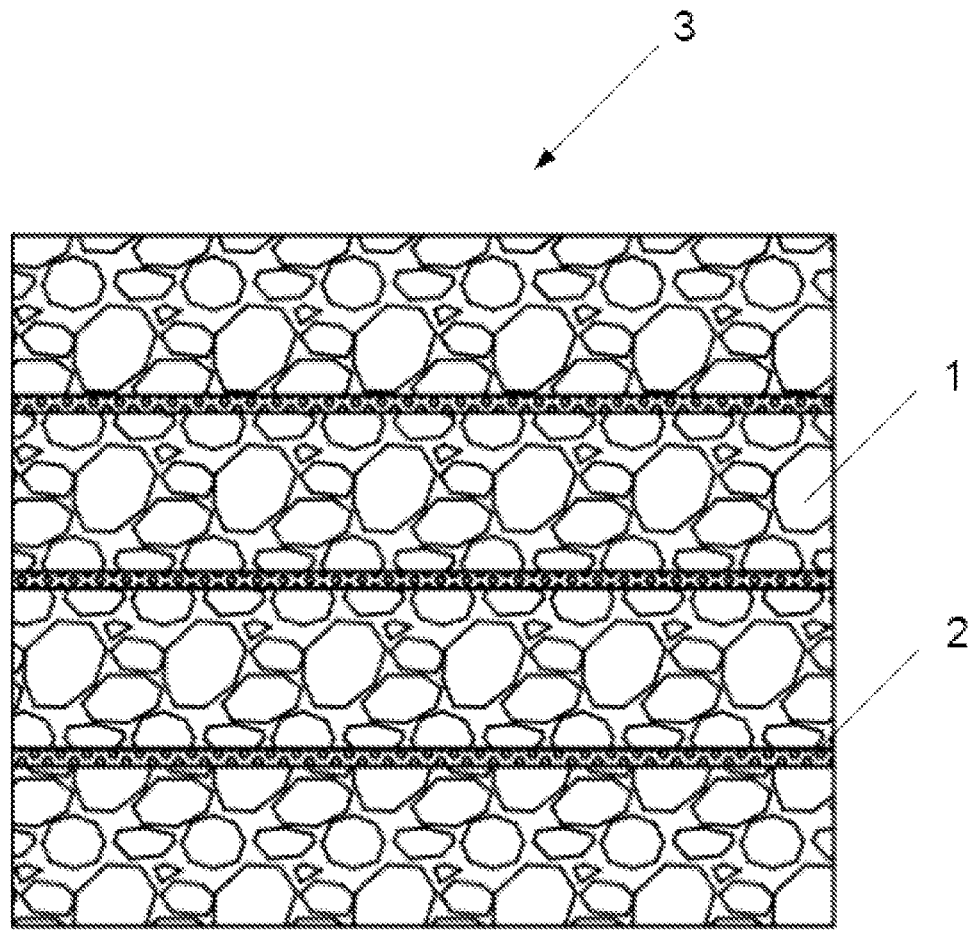
FIG. 1 is a schematic view of a configuration of an assembly body according to one embodiment of the present disclosure.

In order to make the present disclosure more comprehensive, the following set forth with specific embodiments and examples to illustrate the present disclosure. The experimental methods described in the present disclosure are conventional methods unless otherwise specified; the materials mentioned are commercially available unless otherwise specified. Unless otherwise defined, all technical and scientific terms used herein have the same meaning as commonly understood by those skilled in the art. In the case of inconsistency, the meaning described herein or the meaning derived from the content described herein shall prevail. In addition, the technical terms used herein are for the purpose of describing embodiments of the present disclosure only and are not intended to be limiting of the present disclosure.

In order to describe the technical content of the present disclosure and to understand the present disclosure in a more comprehensive manner, the following explanations or definitions of the words and terms used herein are given before the specific embodiments and examples.

The words "one embodiment" or "an embodiment" as used herein means that a particular feature, step, or characteristic described in connection with the embodiment is included in at least one embodiment of the present disclosure. Thus, appearances of the phrases "in one embodiment" or "in an embodiment" herein are not necessarily referring to the same embodiment, but may. Furthermore, the particular features, steps or characteristics may be combined in any suitable manner in one or more embodiments, as would be obvious to those skilled in the art.

The term "vacuum diffusion welding furnace" as used herein is an apparatus capable of applying pressure to a workpiece while providing a vacuum environment for the workpiece.

The term "vacuum furnace" as used herein is an apparatus capable of providing a vacuum environment for a workpiece.

The term "atmosphere-shielded furnace" as used herein is an apparatus capable of providing an inert gas environment for a workpiece.

The term "titanium-zirconium-molybdenum alloy" as used herein, also referred to TZM alloy, has a composition of 0.4 wt % to 0.55 wt % titanium, 0.06 wt % to 0.12 wt % zirconium and 0.01 wt % to 0.04 wt % carbon. On one hand, titanium and zirconium elements are dissolved into a molybdenum matrix to cause lattice distortion, so that the solid solution strengthening of the titanium-zirconium-molybdenum alloy is realized; on the other hand, titanium reacts with the carbon and zirconium, respectively, to form fine and dispersed TiC and ZrC particles, so that second phase strengthening is realized. Due to the alloying effect, the TZM alloy not only has the characteristics of molybdenum, which are high melting point, small expansion coefficient, low vapor pressure and good electric and heat conductivities, but also has higher recrystallization temperature (1350° C.-1400° C.) and more superior high-temperature mechanical property and corrosion resistance. The term "diffusion bonding" as used herein is a process in which bonded surfaces are brought into tight contact by plastic deformation under the action of high temperature and pressure, and forms a reliable joint by inter-atomic diffusion for a period of time. The method is particularly suitable for preparing the joint with larger bonding area and higher requirements on dimensional accuracy and mechanical property.

The term "isothermal forging" as used herein is a forging technique in which the die and the formed piece are at substantially the same temperature.

The term "constructing and forging" as used herein is an additive manufacturing process for manufacturing a large metal blank using a plurality of metal blanks of smaller volume as construction units.

The expression "axial" as used herein is the direction perpendicular to the bonding surface of the plate-shaped unit of titanium-zirconium-molybdenum alloy with the foil intermediate layer.

The technical solutions of the present disclosure will be described in detail with reference to FIGS. 1 to 4.

FIG. 1 shows an assembly body 3 according to one embodiment of the present disclosure, which is square in cross section. As shown in FIG. 1, the assembly body 3 is composed of four plated-shaped units 1 of titanium-zirconium-molybdenum alloy and three foil-shaped intermediate layers 2, each of the foil-shaped intermediate layers 2 being sandwiched between the plated-shaped units 1 of titanium-zirconium-molybdenum alloy, respectively. In this embodiment, each of the plated-shaped units 1 of titanium-zirconium-molybdenum alloy is prepared to have a uniform shape, and each of the foil-shaped intermediate layers 2 is prepared to have a uniform shape, to form an assembly body 3 having a cross section as shown. It will be appreciated that in other embodiments of the present disclosure, it is possible to prepare each of plate-shaped units 1 of titanium-zirconium-molybdenum alloy in a non-uniform shape and/or to prepare each of foil-shaped intermediate layers 2 in a non-uniform shape so as to form a cross section of the desired shape, thereby forming an assembly body 3 of the desired configuration. For example, each of the plate-shaped units 1 of titanium-zirconium-molybdenum alloy and the foil-shaped intermediate layers 2 may be prepared in different shapes so that the assembly body 3 has a smoothly curved profile in the thickness direction from top to bottom. For example, some of the plated-shaped units 1 of titanium-zirconium-molybdenum alloy and the foil-shaped intermediate layers 2 may be prepared in a hollow shape so that the assembly body 3 has a hollow cavity, thereby enabling a die blank as a die to prepare a died article using the hollow cavity.

Figure 2:
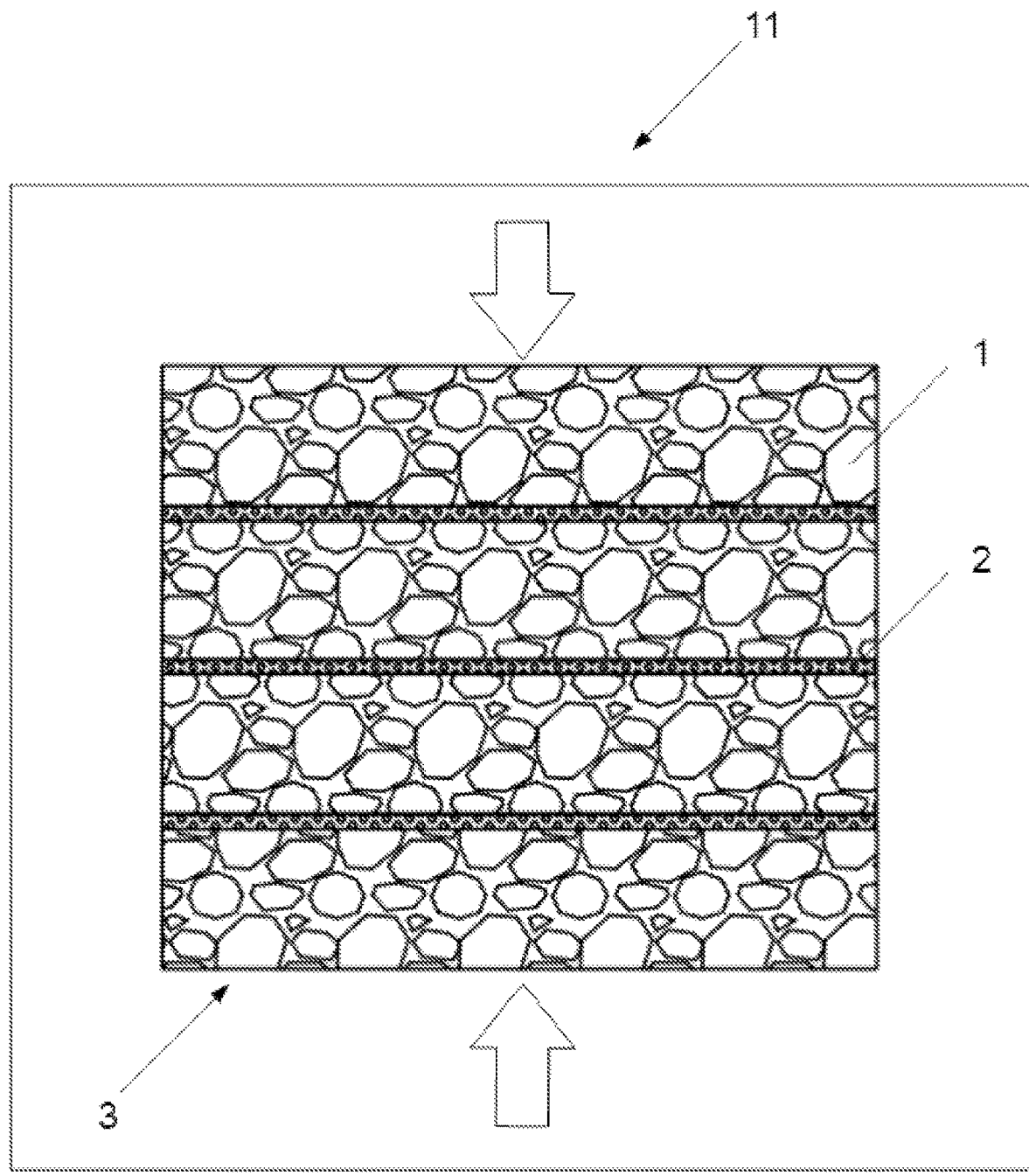
FIG. 2 is a schematic view of diffusion bonding according to one embodiment of the present disclosure.

FIG. 2 shows a schematic view of diffusion bonding according to one embodiment of the present disclosure. After the assembly body 3 is placed into the vacuum diffusion welding furnace 11, the vacuum diffusion welding furnace 11 is started, so that the temperature in the vacuum diffusion welding furnace 11 reaches a bonding temperature which is 20-100° C. lower than the recrystallization temperature of the titanium-zirconium-molybdenum alloy, and the vacuum degree reaches $10^{-3}$ to $10^{-2}$ Pa. Then, the assembly body 3 is subjected a pressure of 6 to 9 MPa in the axial direction indicated by the arrow by the vacuum diffusion welding furnace 11, and held at that pressure for not less than 3 hours. A primary black 4 is then taken out of the vacuum diffusion furnace 11.

It will be appreciated that, at the time of formation of the primary blank 4, diffusion bonding has taken place among the plated-shaped units 1 of titanium-zirconium-molybdenum alloy and the foil-shaped intermediate layers 2, the molybdenum element in the plated-shaped units 1 of titanium-zirconium-molybdenum alloy having diffused into the foil-shaped intermediate layers 2, and the metal elements in the foil-shaped intermediate layer 2 having diffused into the plated-shaped units 1 of titanium-zirconium-molybdenum alloy, so that new intermediate structures 5 (see FIG. 3) are formed between plate-shaped units 1' of the titanium-zirconium-molybdenum. The intermediate structure 5 has, at the bonding interfaces, diffusion layers 7 and possibly metal foil layer exist between the diffusion layers 7 (in some of other embodiments, the foil-shaped intermediate layer 2 is considered to be partially or completely extinct, due to the complete penetration of the molybdenum element into the foil-shaped intermediate layer to form a solid solution). Due to the formation of the new intermediate structures 5, it can be considered that, at a microscopic level, a plate-shaped unit 1' titanium-zirconium-molybdenum is thinner than a plate-shaped unit 1 of titanium-zirconium-molybdenum alloy, while a metal foil layer is thinner than a foil-shaped intermediate layer 2.

Figure 3:
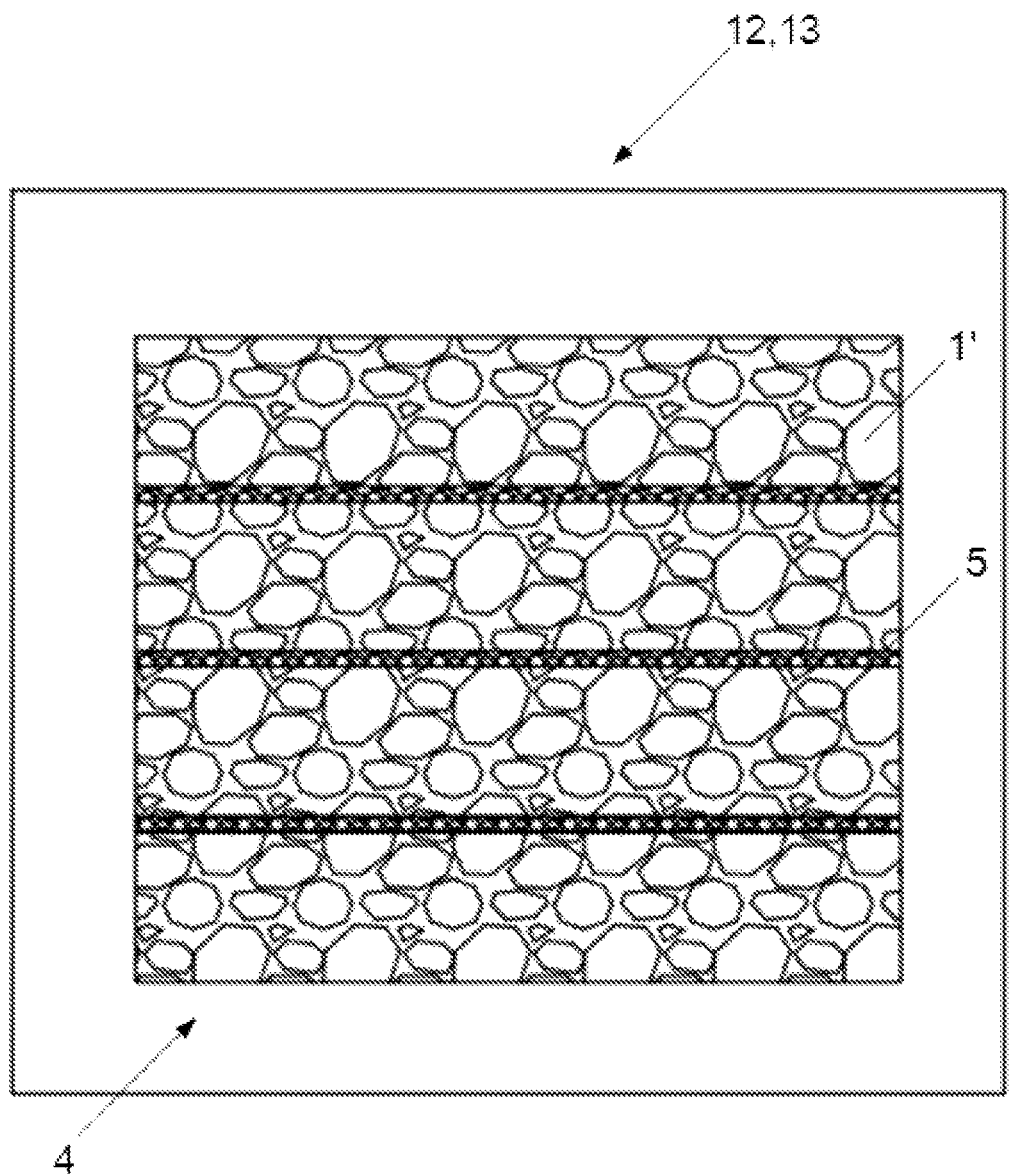
FIG. 3 is a schematic view of a homogenization process according to one embodiment of the present disclosure.

FIG. 3 shows a schematic diagram of a homogenization process according to one embodiment of the present disclosure. After the primary blank 4 is placed into a vacuum furnace 12 or an atmosphere-shielded furnace 13, the vacuum furnace 12 or the atmosphere-shielded furnace 13 is started, so that the vacuum degree reaches $10^{-3}$-$10^{-2}$ Pa or the furnace is filled with inert gas, and the furnace temperature reaches a homogenization temperature which is 50-150° C. lower than the recrystallization temperature of the titanium-zirconium-molybdenum alloy. After reaching the homogenization temperature, it is held at this temperature for 2 to 24 hours to homogenize the microstructure and composition in the primary blank 4 at the bonding interfaces to form a die blank 6 (see FIG. 4).

Figure 4:
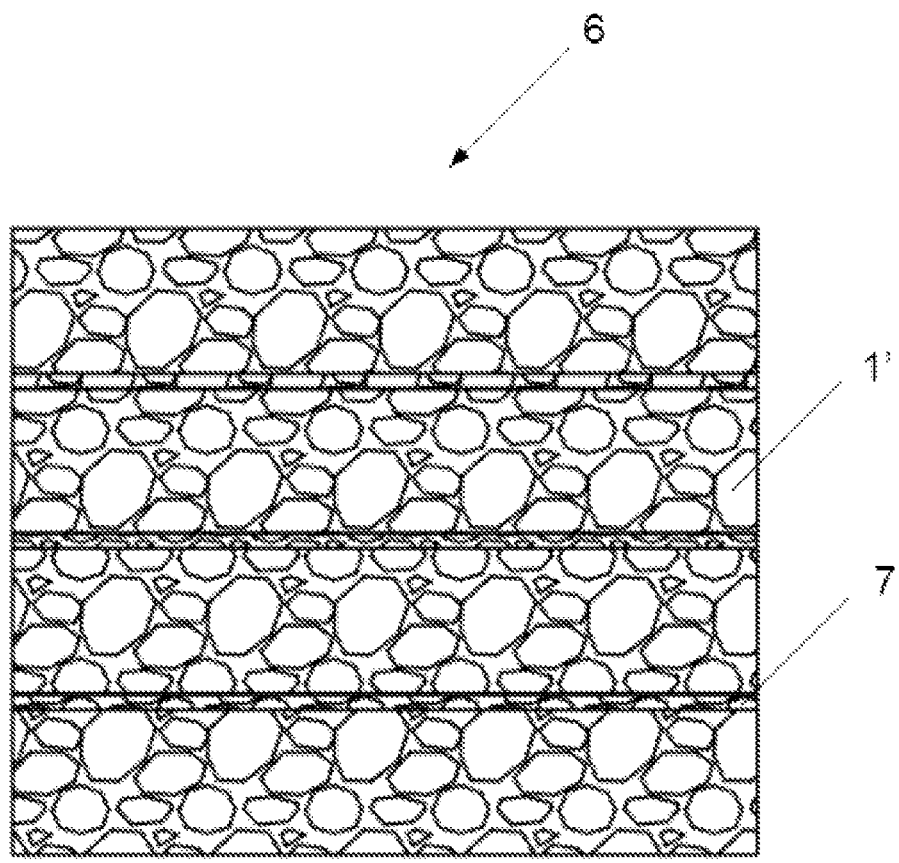
FIG. 4 is a schematic view of a configuration of a die blank according to one embodiment of the present disclosure.

FIG. 4 shows a die blank 6 according to one embodiment of the present disclosure. The die blank 6 consists of plate-shaped units 1' of titanium-zirconium-molybdenum and diffusion layers 7. In the present embodiment, interdiffusion further occurs in the primary blank 4 during homogenization, and the metal foil layer remaining in the intermediate structure 5 disappears completely with the further interdiffusion, and therefore the intermediate structure 5 is transformed into a diffusion layer 7 composed of molybdenum-titanium/niobium solid solution, thereby forming the die blank 6.

In some embodiments of the present disclosure, particularly embodiments in which relatively thick tantalum foil, niobium tungsten alloy foil, or tantalum tungsten foils are used as the intermediate layers, the metal foil layers with a certain thickness remain in the die blank 6. However, since tantalum foil, niobium-tungsten and tantalum-tungsten are high-melting alloys and have a high-temperature strength, the residual metal foil layers would not significantly affect the high-temperature properties of the die blank 6, while the diffusion layers that have already been formed are sufficient to provide the mechanical properties required for the die blank 6 as a die. Furthermore, in the embodiments in which thicker tantalum foils, niobium-tungsten foils, or tantalum-tungsten foils are used as the intermediate layers, the element distribution of the diffusion layers 7 is not uniform, and the molybdenum element is distributed in a gradient concentration. However, since molybdenum element can improve the high temperature properties of the intermediate layers, the diffusion layers 7 in which titanium element is distributed in a gradient concentration do not significantly affect the high temperature properties of the die blank 6, while the diffusion layers that have been formed are sufficient to provide the mechanical properties required for the die blank 6 as a die.

In summary, the present disclosure has the following advantages.

By adding the tantalum foils, the niobium-tungsten foils or the tantalum-tungsten foils as the intermediate layers, the problems of high yield strength, high melting point, difficulties in plastic deformation of the bonding surface and diffusion of titanium-zirconium-molybdenum alloy at high temperature are solved.

By adding the specific intermediate layers, the homogenization process and the cooling process based on the metal constructing and forging process, the problems that a titanium-zirconium-molybdenum alloy large blank is difficult to prepare, and has uneven performance and poor performance are solved. Furthermore, the blank is subjected to homogenization treatment after diffusion bonding, so that the elements of the intermediate structures and the molybdenum element of the titanium-zirconium-molybdenum alloy are fully interdiffused, forming significant diffusion layers which have high bonding strength at the bonding interfaces of the units. In addition, the intermediate layers essentially have high strength at normal and high temperature and then are fully interdiffused with the element of titanium-zirconium-molybdenum alloy, and the bonding interface of each of units of titanium-zirconium-molybdenum alloy has great performance at normal and high temperature.

The bonding temperature is lower than the recrystallization temperature of the titanium-zirconium-molybdenum alloy by 20-100° C. After the plated-shaped units of titanium-zirconium-molybdenum alloy are subjected to diffusion bonding, there is no significant change in the microstructure and properties.

The method does not need to carry out vacuum electron beam welding encapsulation on each unit, and has relatively simple steps and lower manufacturing cost.

The method reduces the requirements of the diffusion bonding on the roughness of the bonding surface of the titanium-zirconium-molybdenum alloy, the bonding temperature, the bonding pressure and the heat preservation time. The present disclosure also avoids the problems of limited capability and high investment of powder metallurgy equipment.

The shape of the units can be designed according to actual needs. The diffusion additive manufacturing of solid, hollow and irregular-shaped blanks can be realized. The method is flexible and well-adapted.

Compared with the existing metal constructing and forging methods, the methods of the present disclosure are more suitable for constructing and forging of high-melting-point refractory alloys and low-deformation alloys, such as molybdenum alloys, tungsten alloys and nickel-based alloys.

Exemplary embodiments of the present disclosure are described below for ease of implementation.

Example 1

This example is a vacuum isothermal forged titanium-zirconium-molybdenum die blank for a nickel base superalloy blade, having sizes of 200×200×60 mm (length× width×thickness). The vacuum isothermal forging titanium-zirconium-molybdenum die blank adopts three plated-shaped units of titanium-zirconium-molybdenum alloy with sizes of 200×200×20 mm (length×width×thickness) and two Nb-10 W foil-shaped intermediate layers with the length and width of 200×200 mm and the thickness of 80 μm. They are subjected to diffusion bonding additive manufacturing in a vacuum diffusion welding furnace and diffusion homogenization treatment in the vacuum furnace. The method comprises the following specific steps.

In a step 1: the plate-shaped units of titanium-zirconium-molybdenum alloy are machined, pre-grinded and polished to ensure that the roughness Ra of bonding surfaces of plate-shaped units of titanium-zirconium-molybdenum alloy is 0.4-0.8, and parallelism between each bonding surface and the pressure surface of the plated-shaped units of titanium-zirconium-molybdenum alloy contacted with the pressure of the vacuum diffusion welding furnace is less than 0.02 mm.

In a step 2: the foil-shaped intermediate layers are soaked in 10 wt % hydrochloric acid for 10 min, washed with clear water, ultrasonic cleaned in alcohol or acetone, and air dried.

In a step 3: the plated-shaped units of titanium-zirconium-molybdenum alloy and the Nb-10 W foil-shaped intermediate layers treated in the steps 1 and 2 are assembled in an interlaced manner, stacking into 5 layers (3 layers of titanium-zirconium-molybdenum alloy plates and 2 layers of foil-shaped intermediate layers) to form an assembly body. The niobium alloy foil-shaped intermediate layer may be fixed on the plate-shaped unit of titanium-zirconium-molybdenum alloy by means of capacitor discharge welding to prevent dislocation during assembly.

In a step 4: the assembly body is placed in a vacuum diffusion welding furnace, and 0.2 MPa axial pressure is applied to the assembly body for fixation. Then, vacuumizing is started, and when the vacuum degree reaches $2\times10^{-3}$ Pa, heating is started to raise the temperature. In the first stage, the temperature is raised to 500° C. at the speed of 15° C./min and is kept for 30 min, so that oil stains in the furnace and on the surfaces of the assembly body are volatilized; in the second stage, the temperature is raised to 1000° C. at the speed of 10° C./min and is kept for 15 min to uniform the temperature in the furnace; in the third stage, the temperature is raised to a diffusion bonding temperature of 1330° C. at a rate of 5° C./min. After reaching the bonding temperature of 1330° C., an axial pressure of 9 MPa was applied to the assembly body, and temperature was kept for 6 hours to facilitate diffusion bonding, thereby obtaining a primary blank.

In a step 5: after the diffusion bonding heat preservation is finished, the axial pressure is removed, the temperature in the furnace is reduced to 1220° C. and kept for 8 hours for the homogenization treatment, so that the bonding stress is eliminated and the composition and the microstructure at the bonding interface are homogenized.

In a step 6: after the homogenization heat preservation is finished, cooling is started. In the stage of cooling from 1200° C. to 1000° C., the cooling rate is 2-6° C./min; in the stage of cooling from 1000° C. to 500° C., the cooling rate is 10-15° C./min. When the temperature reaches 500° C., the temperature is kept for 1 hour for annealing to remove stress. After removing stress, the blank is cooled with the furnace to room temperature, and a titanium-zirconium-molybdenum alloy die blank is thus obtained.

Example 2

This example is a vacuum isothermal forged titanium-zirconium-molybdenum die blank for a nickel base superalloy impeller disc, having sizes 500×500×200 mm (length× width×thickness). The vacuum isothermal forging titanium-zirconium-molybdenum die blank adopts four plated-shaped units of titanium-zirconium-molybdenum alloy with sizes of 500×500×50 mm (length×width×thickness) and three Ta-2.5 W foil-shaped intermediate layers with the length and width of 500×500 mm and the thickness of 60 μm. They are subjected to diffusion bonding additive manufacturing in a vacuum diffusion welding furnace and diffusion homogenization treatment in a vacuum furnace. The method comprises the following specific steps.

In a step 1: the plate-shaped units of titanium-zirconium-molybdenum alloy are machined, pre-grinded and polished to ensure that the roughness Ra of bonding surfaces of plate-shaped units of titanium-zirconium-molybdenum alloy is 0.4-0.8, and parallelism between each bonding surface and the pressure surface of the plated-shaped units of titanium-zirconium-molybdenum alloy contacted with the pressure head of the vacuum diffusion welding furnace is less than 0.02 mm.

In a step 2: the foil-shaped intermediate layers are soaked in 10 wt % hydrochloric acid for 10 min, washed with clear water, ultrasonic cleaned in alcohol or acetone, and air dried.

In a step 3: the plated-shaped units of titanium-zirconium-molybdenum alloy and the Ta-2.5 W foil-shaped intermediate layers treated in the steps 1 and 2 are assembled in an interlaced manner, stacking into 7 layers (4 layers of titanium-zirconium-molybdenum alloy plates and 3 layers of foil-shaped intermediate layers) to form an assembly body. The tantalum alloy foil-shaped intermediate layer may be fixed on the plate-shaped unit of titanium-zirconium-molybdenum alloy by means of capacitor discharge welding to prevent dislocation during assembly.

In a step 4: the assembly body is placed in a vacuum diffusion welding furnace, and 0.2 MPa axial pressure is applied to the assembly body for fixation. Then, vacuumizing is started, and when the vacuum degree reaches $2\times10^{-3}$ Pa, heating is started to raise the temperature. In the first stage, the temperature is raised to 500° C. at the speed of 15° C./min and is kept for 30 min, so that oil stains in the furnace and on the surfaces of the assembly body are volatilized; in the second stage, the temperature is raised to 1000° C. at the speed of 10° C./min and is kept for 15 min to uniform the temperature in the furnace; in the third stage, the temperature is raised to a diffusion bonding temperature of 1300° C. at a rate of 5° C./min. After reaching the bonding temperature of 1300° C., an axial pressure of 7 MPa was applied to the assembly body, and temperature was kept for 5 hours to facilitate diffusion bonding. After the diffusion bonding heat preservation is finished, a primary blank obtained is cooled with the furnace to room temperature and then is removed from the furnace.

In a step 5: the primary blank is placed into the atmosphere-shielded furnace which is then filled with nitrogen gas and heated. The temperature in the furnace is raised to 1250° C. and kept for 12 hours for the homogenization treatment.

In a step 6: after the homogenization heat preservation is finished, cooling is started. In the stage of cooling from 1250° C. to 1000° C., the cooling rate is 2-6° C./min; in the stage of cooling from 1000° C. to 500° C., the cooling rate is 10-15° C./min. When the temperature reaches 500° C., the temperature is kept for 1 hour for annealing to remove stress. After removing stress, the blank is cooled with the furnace to room temperature, and a titanium-zirconium-molybdenum alloy die blank is thus obtained.

Example 3

This example is a vacuum isothermal forged titanium-zirconium-molybdenum die blank for a titanium alloy compressor disc having sizes of 400×400×160 mm (length×width×thickness). The vacuum isothermal forging titanium-zirconium-molybdenum die blank adopts four plated-shaped units of titanium-zirconium-molybdenum alloy with sizes of 400×400×40 mm (length×width×thickness) and three Ta-10 W foil-shaped intermediate layers with the length and width of 400×400 mm and the thickness of 60 μm. They are subjected to diffusion bonding additive manufacturing in a vacuum diffusion welding furnace and diffusion homogenization treatment in the vacuum furnace. The method comprises the following specific steps.

In a step 1: the plate-shaped units of titanium-zirconium-molybdenum alloy are machined, pre-grinded and polished to ensure that the roughness Ra of bonding surfaces of plate-shaped units of titanium-zirconium-molybdenum alloy is 0.4-0.8, and parallelism between each bonding surface and the pressure surface of the plated-shaped units of titanium-zirconium-molybdenum alloy contacted with the pressure head of the vacuum diffusion welding furnace is less than 0.02 mm.

In a step 2: the foil-shaped intermediate layers are soaked in 10 wt % hydrochloric acid for 10 min, washed with clear water, ultrasonic cleaned in alcohol or acetone, and air dried.

In a step 3: the plated-shaped units of titanium-zirconium-molybdenum alloy and the Ta-10 W foil-shaped intermediate layers treated in the steps 1 and 2 are assembled in an interlaced manner, stacking into 7 layers (4 layers of titanium-zirconium-molybdenum alloy plates and 3 layers of foil-shaped intermediate layers) to form an assembly body. The tantalum alloy foil-shaped intermediate layer may be fixed on the plate-shaped unit of titanium-zirconium-molybdenum alloy by means of capacitor discharge welding to prevent dislocation during assembly.

In a step 4: the assembly body is placed in a vacuum diffusion welding furnace, and 0.2 MPa axial pressure is applied to the assembly body for fixation. Then, vacuumizing is started, and when the vacuum degree reaches $2 \times 10^{-3}$ Pa, heating is started to raise the temperature. In the first stage, the temperature is raised to 500° C. at the speed of 15° C./min and is kept for 30 min, so that oil stains in the furnace and on the surfaces of the assembly body are volatilized; in the second stage, the temperature is raised to 1000° C. at the speed of 10° C./min and is kept for 15 min to uniform the temperature in the furnace; in the third stage, the temperature is raised to a diffusion bonding temperature of 1300° C. at a rate of 5° C./min. After reaching the bonding temperature of 1300° C., an axial pressure of 6 MPa was applied to the assembly body, and temperature was kept for 3 hours to facilitate diffusion bonding, thereby obtaining a primary blank.

In a step 5: after the diffusion bonding heat preservation is finished, the axial pressure is removed, the temperature in the furnace is reduced to 1220° C. and kept for 10 hours for the homogenization treatment, so that the bonding stress is eliminated and the composition and the microstructure at the bonding interface are homogenized.

In a step 6: after the homogenization heat preservation is finished, cooling is started. In the stage of cooling from 1220° C. to 1000° C., the cooling rate is 2-6° C./min; in the stage of cooling from 1000° C. to 500° C., the cooling rate is 10-15° C./min. When the temperature reaches 500° C., the temperature is kept for 1 hour for annealing to remove stress. After removing stress, the blank is cooled with the furnace to room temperature, and a titanium-zirconium-molybdenum alloy die blank is thus obtained.

Example 4

This example is a vacuum isothermal forged titanium-zirconium-molybdenum die blank for a titanium alloy impeller disc, having sizes of 300×150 mm (diameter×thickness). The vacuum isothermal forging titanium-zirconium-molybdenum die blank adopts three plated-shaped units of titanium-zirconium-molybdenum alloy with sizes of 300×50 mm (diameter×thickness) and two tantalum foil-shaped intermediate layers with the diameter of 300 mm and the thickness of 40 μm. They are subjected to diffusion bonding additive manufacturing in a vacuum diffusion welding furnace and diffusion homogenization treatment in the vacuum furnace. The method comprises the following specific steps.

In a step 1: the plate-shaped units of titanium-zirconium-molybdenum alloy are machined, pre-grinded and polished to ensure that the roughness Ra of bonding surfaces of plate-shaped units of titanium-zirconium-molybdenum alloy is 0.4-0.8, and parallelism between each bonding surface and the pressure surface of the plated-shaped units of titanium-zirconium-molybdenum alloy contacted with the pressure head of the vacuum diffusion welding furnace is less than 0.02 mm.

In a step 2: the foil-shaped intermediate layers are soaked in 10 wt % hydrochloric acid for 10 min, washed with clear water, ultrasonic cleaned in alcohol or acetone, and air dried.

In a step 3: the plated-shaped units of titanium-zirconium-molybdenum alloy and the tantalum foil-shaped intermediate layers treated in the steps 1 and 2 are assembled in an interlaced manner, stacking into 5 layers (3 layers of titanium-zirconium-molybdenum alloy plates and 2 layers of foil-shaped intermediate layers) to form an assembly body. The tantalum foil-shaped intermediate layer may be fixed on the plate-shaped unit of titanium-zirconium-molybdenum alloy by means of capacitor discharge welding to prevent dislocation during assembly.

In a step 4: the assembly body is placed in a vacuum diffusion welding furnace, and 0.2 MPa axial pressure is applied to the assembly body for fixation. Then, vacuumizing is started, and when the vacuum degree reaches $2 \times 10^{-3}$ Pa, heating is started to raise the temperature. In the first stage, the temperature is raised to 500° C. at the speed of 15° C./min and is kept for 30 min, so that oil stains in the furnace and on the surfaces of the assembly body are volatilized; in the second stage, the temperature is raised to 1000° C. at the speed of 10° C./min and is kept for 15 min to uniform the temperature in the furnace; in the third stage, the temperature is raised to a diffusion bonding temperature of 1320° C. at a rate of 5° C./min. After reaching the bonding temperature of 1320° C., an axial pressure of 6 MPa was applied to the assembly body, and temperature was kept for 3 hours to facilitate diffusion bonding, thereby obtaining a primary blank.

In a step 5: after the diffusion bonding heat preservation is finished, the axial pressure is removed, the temperature in the furnace is reduced to 1200° C. and kept for 12 hours for the homogenization treatment, so that the bonding stress is eliminated and the composition and the microstructure at the bonding interface are homogenized.

In a step 6: after the homogenization heat preservation is finished, cooling is started. In the stage of cooling from 1200° C. to 1000° C., the cooling rate is 2-6° C./min; in the stage of cooling from 1000° C. to 500° C., the cooling rate is 10-15° C./min. When the temperature reaches 500° C., the temperature is kept for 1 hour for annealing to remove stress. After removing stress, the blank is cooled with the furnace to room temperature, and a titanium-zirconium-molybdenum alloy die blank is thus obtained.

The foregoing is illustrative only of the embodiments of the present disclosure and the principles of the technology employed. Those skilled in the art will appreciate that the present disclosure is not limited to the particular embodiments described herein, which embodiments may be modified, rearranged and substituted without departing from the scope of the present disclosure. Therefore, although the present disclosure has been described in more detail with reference to the foregoing embodiments, the present disclosure is not limited to the foregoing embodiments, and may include other equivalent embodiments without departing from the spirit of the present disclosure, and all such equivalent embodiments are encompassed in the scope of the present disclosure.

The invention claimed is:

1. A preparation method of a large-scale die blank for isothermal forging, said method comprising:
providing a plurality of plate-shaped units of titanium-zirconium-molybdenum alloy with a thickness of 20-100 mm based on predetermined shape(s);
providing a plurality of foil-shaped intermediate layers of tantalum, niobium-tungsten alloy or tantalum-tungsten alloy with a thickness of 40-150 µm based on predetermined shape(s);
successively assembling the plate-shaped units of titanium-zirconium-molybdenum alloy and the foil-shaped intermediate layers based on a predetermined configuration to form an assembly body so that each of the foil-shaped intermediate layers is sandwiched between the plate-shaped units of titanium-zirconium-molybdenum alloy in the assembly body;
applying an axial pressure of 6-9 MPa for a bonding time of not less than 3 hours to the assembly body at a bonding temperature 20-100° C. lower than a recrystallization temperature of the titanium-zirconium-molybdenum alloy and a vacuum degree of $10^{-3}$-$10^{-2}$ Pa by a vacuum diffusion welding furnace, so that diffusion bonding between the plated-shaped units of titanium-zirconium-molybdenum alloy and the foil-shaped intermediate layers occurs to obtain a primary blank;
homogenizing the primary blank for a homogenization time of 2-24 hours at a homogenization temperature 50-150° C. lower than the recrystallization temperature of the titanium-zirconium-molybdenum alloy under vacuum or inert gas protection to homogenize a microstructure and composition at bonding interfaces in the primary blank; and
cooling the homogenized primary blank to obtain a die blank, wherein the recrystallization temperature of the titanium-zirconium-molybdenum alloy is in a range of 1350-1400° C.

2. The preparation method according to claim 1, wherein providing the plurality of plated-shaped units of titanium-zirconium-molybdenum alloy with the thickness of 20-100 mm, the plated-shaped units of titanium-zirconium-molybdenum alloy are subjected to machining, pre-grinding and polishing, so that a roughness Ra of a bonding surface of the plated-shaped units of titanium-zirconium-molybdenum alloy with the foil-shaped intermediate layers is 0.4-0.8, and parallelism between each bonding surface and a pressure surface of the plated-shaped units of titanium-zirconium-molybdenum alloy subjected to the axial pressure is less than 0.02 mm.

3. The preparation method according to claim 1, wherein the tantalum has a purity of 99.5% or more, and the niobium-tungsten alloy or the tantalum-tungsten alloy is Nb-(2-10) W or Ta-(2-10) W (wt %).

4. The preparation method of claim 1, wherein when providing the plurality of foil-shaped intermediate layers of tantalum, niobium-tungsten alloy, or tantalum-tungsten alloy with a thickness of 60 to 80 µm, the foil-shaped intermediate layers are soaked with 10 wt % hydrochloric acid for 10 minutes, and then the foil-shaped intermediate layers are ultrasonically cleaned with alcohol or acetone.

5. The preparation method according to claim 1, wherein the bonding temperature is a temperature 20-60° C. lower than the recrystallization temperature of the titanium-zirconium-molybdenum alloy, the axial pressure is 7-9 MPa, and the bonding time is 3-6 hours.

6. The preparation method according to claim 1, wherein the homogenization temperature is a temperature 80-150° C. lower than the recrystallization temperature of the titanium-zirconium-molybdenum alloy, and the homogenization time is 5-12 hours.

7. The preparation method according to claim 1, wherein in cooling the homogenized primary blank, the cooling is carried out from the homogenization temperature to 1000° C. at a cooling rate of 2-6° C./min and from 1000° C. to 500° C. at a cooling rate of 10-15° C./min.

8. The preparation method according to claim 7, wherein in cooling the homogenized primary blank, after cooling to 500° C., the blank is held at a temperature of 500° C. for 1 hour to remove stress caused by the cooling.

* * * * *